United States Patent [19]

Hayakawa

[11] 3,902,185

[45] Aug. 26, 1975

[54] IMAGE SIGNAL PROCESSING DEVICE

[75] Inventor: Shigeru Hayakawa, Hirakata, Japan

[73] Assignee: Matsushita Electric Industrial Co., Ltd., Kadoma, Japan

[22] Filed: Jan. 19, 1973

[21] Appl. No.: 325,114

[52] U.S. Cl. ...................... 357/19; 357/29; 357/57; 250/213; 350/160 R

[51] Int. Cl. ........................................ H01l 17/00

[58] Field of Search .................... 317/235, 27.1, 25; 350/160 R; 250/213

[56] References Cited

UNITED STATES PATENTS

| | | | |
|---|---|---|---|
| 3,358,146 | 12/1967 | Ing et al. | 250/213 |
| 3,448,351 | 6/1969 | Baertsch | 317/234 |
| 3,716,740 | 2/1973 | Crowell et al. | 315/11 |

*Primary Examiner*—Michael J. Lynch
*Assistant Examiner*—E. Wojciechowicz
*Attorney, Agent, or Firm*—Wenderoth, Lind & Ponack

[57] ABSTRACT

An image signal processing device is made up of a plurality of sets of series connected elements each of said sets consisting essentially of, in the recited order, a first transparent electrode element; an electricity-to-light conversion element having an electrical resistance R; a negative resistance element having a voltage-current curve which has a transition point from a portion of high resistance $R_h$ to a portion of low resistance $R_l$ at a critical voltage $V_c$; a light-to-electricity conversion element having electrical resistance $R_1$ and $R_2$ when irradiated with light having intensities $L_1$ and $L_2$, respectively, where $L_1$ is lower than and $L_2$ is higher than a critical intensity $L_c$ which causes the negative resistance element in each of the series connections to receive a voltage above or below the critical voltage $V_c$, respectively when each of the series connections is provided with a given voltage V; and a second transparent electrode element. When the light to electricity conversion elements are irradiated with a light image and the given voltage V is applied to the device, each electricity-to-light conversion element is energized by a voltage $RV/(R+R_1+R_h)$ or $RV/R+R_2+R_l)$ when the light-to-electricity conversion element is irradiated with the light intensity $L_1$ or $L_2$, and accordingly the light image has the contrast increased.

11 Claims, 6 Drawing Figures

IMAGE SIGNAL PROCESSING DEVICE

This invention relates to an image signal processing device and more particularly to an image signal processing device which can easily eliminate diffuse information and can easily extract necessary information from original image signals by emphasizing the difference in contrast between two adjacent contrast levels.

Image signals contain many varieties of information, part of which is unnecessary information. There has been a requirement for an image signal processing device which can extract or strengthen only the necessary information from the original image signals.

However, it is very difficult to process the image signals automatically even if electronic computers are used, and therefore the image signals are mostly manually processed at the present time. It would be very desirable to be able to modify the original image signals into a form suitable for an automatic process or easier manual treatment. At the present time, however, such modification is far from practical. For example, a medical doctor must have much experience to distinguish between normal and abnormal information in x-ray photographs which contain typical image signals representing medical information. Furthermore, even an experienced doctor must often observe the photographs for a long time.

Therefore, an object of this invention is to provide an image signal processing device which can emphasize the difference in contrast between two adjacent contrast levels.

Another object of this invention is to provide an image signal processing device which can extract easily the necessary information from original image signals.

A further object of this invention is to provide an image signal processing device which can eliminate easily the diffuse information and noises.

These and other objects of this invention will be apparent upon consideration of the following detailed description taken together with the accompanying drawings wherein.

Figure 1:
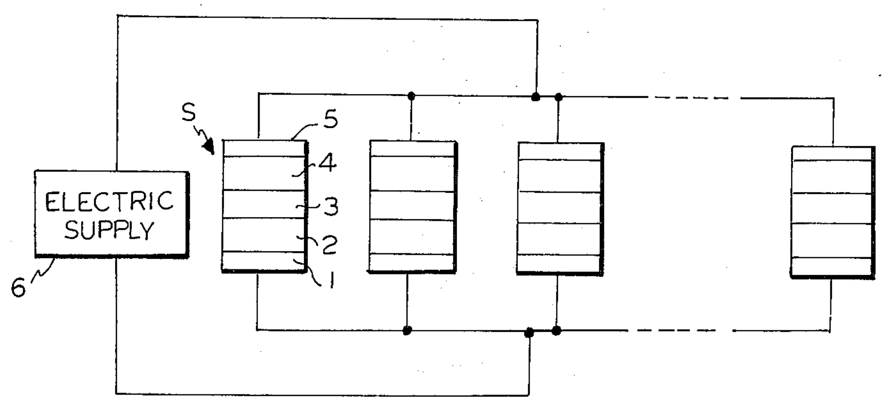
FIG. 1 is a schematic diagram of an embodiment of an image signal processing device according to this invention.
Figure 2:
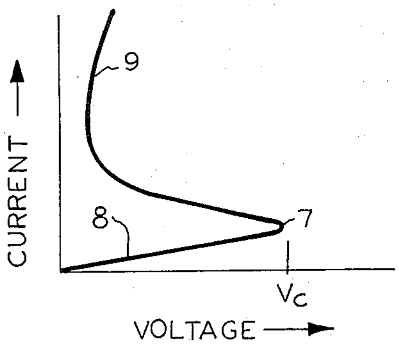
FIG. 2 is a graph showing the current versus voltage characteristic of a negative resistance element used for the image signal processing device of the invention.

Now, an embodiment of the present invention will be described with reference to FIG. 1. Referring to FIG. 1, the image signal processing device comprises a plurality of sets S of series connected abutments, the sets being connected in parallel, and each of said sets of series connected elements consists essentially of a first transparent electrode element 1, an electricity-to-light conversion element 2, a negative resistance element 3, a light-to-electricity conversion element 4 and a second transparent electrode element 5. An electric supply 6 is connected across said parallel connected sets of elements. The voltage-current characteristic curve of said negative resistance element 3 has, as shown in FIG. 2, a transition point 7 from a high resistance portion 8 having a resistance $R_h$ to a low resistance portion 9 having a resistance $R_l$ upon an increase in the voltage at a critical voltage $V_c$. The value of $R_h$ is higher at least by 100 times than that of $R_l$.

Said light-to-electricity conversion element 4 has electrical resistances $R_1$ and $R_2$ when irradiated with light having intensities $L_1$ and $L_2$, respectively, where $L_1$ or is lower than a critical intensity $L_c$ and $L_2$ is higher than the critical density $L_c$, which causes said negative resistance element 3 in each of said series connected elements to receive a voltage below or above said critical voltage $V_c$, respectively. When each of said sets of series connected elements is provided with a given voltage, V and said light to electricity conversion element 4 of the image signal processing device is irradiated with light having said intensity $L_1$ or $L_2$, the voltage $V_E$ appearing at said electricity-to-light conversion element 2 is expressed by $RV/(R+R_1+R_h)$ or $RV/(R+R_2+R_l)$, respectively; where R is the resistance of said electricity-to-light conversion element 2. The brightness, B of the light emitted from said electricity-to-light conversion element 2 is conveniently related to the voltage $V_E$ appearing at the element 2;

$$B = KV_E^n \tag{1}$$

where $n$ is a value between 3 and 7, for practical devices, and K is a constant.

When the contrast of the output image is defined to be the ratio of the brightness of the light emitted from said electricity-to-light conversion element 2 at the input light intensity $L_2$ to that at the input light intensity $L_1$, the contrast C in said image signal processing device according to this invention, is expressed by the following equation:

$$C = \{(R+R_1+R_h)/(R+R_2+R_l)\}^n \tag{2}$$

The contrast $C_0$ in a conventional image signal processing device which does not contain a negative resistance element, is expressed by the following equation:

$$C_0 = \{(R+R_l)/(R+R_2)\}^n \tag{3}$$

$R_1$ is a little larger than $R_2$, whereas $R_h$ is much larger than $R_l$. Therefore, C is larger than $C_0$, and accordingly the contrast in the image signal processing device is enhanced by utilising the negative resistance element.

Said first transparent electrode element 1 and said second transparent electrode element 5 can be a transparent tin oxide film. Said electricity-to-light conversion element 2 consists essentially of a light emitting diode or an electroluminescent material such as zinc sulfide or zinc selenide. Said light-to-electricity conversion element 4 consists essentially of a photoconductive material such as cadmium sulfide or cadmium selenide. Said negative resistance element 3 having a V-I characteristic curve as shown in FIG. 2 consists essentially of a switching transistor, a switching diode, and a thermistor having a negative temperature coefficient of resistance (designated as a NTC thermistor in the following description).

Figure 3:
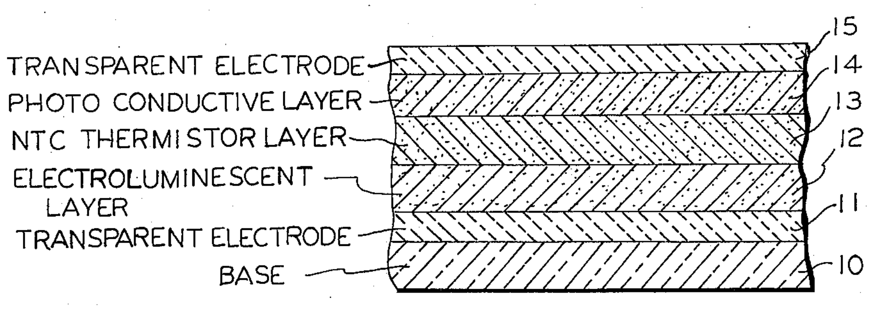
FIG. 3 is a schematic diagram of another embodiment of an image signal processing device according to this invention.

A better result can be obtained by forming said plurality of series connected elements into a single panel according to the invention. Referring to FIG. 3, a first transparent electrode layer 11 is deposited on a transparent base 10 such as a glass plate in accordance with techniques well known techniques in the art. An electroluminescent layer 12 is integrally formed on said first transparent electrode layer 11 by applying a paste containing an electroluminescent material dispersed in a vehicle or by depositing a thin layer of electroluminescent material in accordance with the techniques well known in the art. A NTC thermistor layer 13 is fabricated by applying a paste containing powdered NTC thermistor dispersed in a vehicle to said electroluminescent layer 12 and curing said paste. A photoconductive layer 14 is integrally formed on said NTC thermistor layer 13. This can be achieved by any suitable and available method, for example, a coating method for applying a paste containing powdered photoconductive material dispersed in a vehicle to said NTC thermistor layer 13. A second transparent electrode layer 15 is placed on said photoconductive layer 14. Said NTC thermistor layer 13 is colored black, so that it also acts as a light blocking layer.

Figure 4:
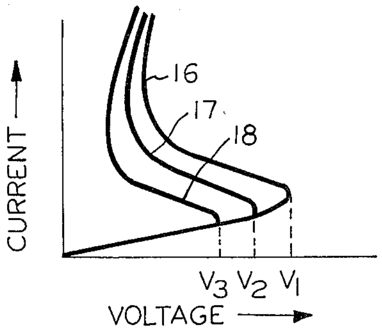
FIG. 4 is a graph showing current versus voltage characteristics, with variation of the temperature, of a thermistor layer having negative temperature coefficient of resistance used for the image signal processing device of the invention.

It is desirable that the critical voltage $V_c$ can be easily changed so as to emphasize the different in contrast between two adjacent contrast levels. As shown in FIG. 4, the V-I characteristic curve of said NTC thermistor layer 13 shifts from curve 16 to curve 18 in accordance with an increase in the temperature of said NTC thermistor layer 13, and accordingly the critical voltage changes from $V_1$ to $V_3$.

Figure 5:
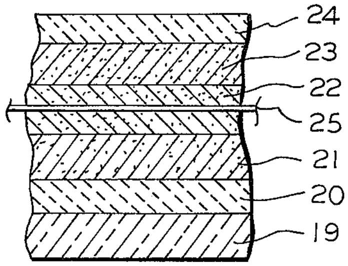
FIG. 5 is a schematic diagram of still another embodiment of an image signal processing device according to this invention which can easily control the critical voltage.

Referring to FIG. 5, the image signal processing panel of the invention comprises integrated layers of a transparent base 19, a first transparent electrode layer 20, an electroluminescent layer 21, a NTC thermistor layer 22, a photoconductive layer 23 and a second transparent electrode layer 24 in the described order. Said NTC thermistor layer 22 has a heating element 25 embedded therein. Said heating element 25 consists of a metallic wire or a thin metallic film. The temperature of said NTC thermistor layer 22 is increased by an electric current flowing through said heating element 25, and as a result the size of the critical voltage can be controlled.

Figure 6:
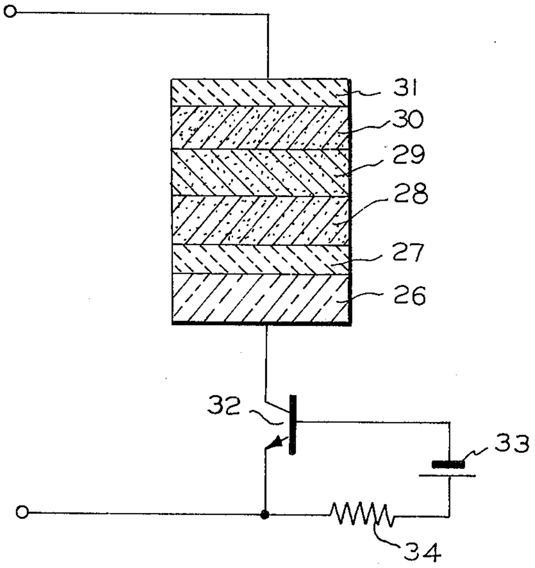
FIG. 6 is a schematic diagram of still another embodiment of an image signal processing device according to this invention which can easily control the critical voltage.

The aforesaid $V_c$ can be controlled by biasing a switching transistor used for said negative resistance element. Referring to FIG. 6, a first transparent electrode element 27 is formed on a transparent base 26. An electricity-to-light conversion element 28 such as an electroluminescent material is integrally formed on said first transparent electrode element 27. A light-to-electricity conversion element 30 such as a photoconductive material is integrally formed on said electricity-to-light conversion element 28. A light blocking element 29 is preferably sandwiched between said electricity-to-light conversion element 28 and said light-to-electricity conversion element 30. A second transparent electrode element 31 is placed on said light-to-electricity conversion element 30. A switching transistor 32 is connected to said first transparent electrode element 27, and it is biased between the emitter and the base thereof by an electric source 33 and a variable resistor 34. The size of the critical voltage of said switching transistor 32 varies with the variation of the bias voltage, and accordingly the difference in contrast in the output image can be emphasized between two adjacent contrast levels. Said switching transistor 32 may be connected to said second transparent electrode element 31 instead of said first transparent electrode element 27.

While the embodiments which have been described at present are believed to be the preferred embodiments of this invention, it will be obvious that various changes and modifications can be made therein without departing from the spirit or scope of the invention.

What we claim is:

1. An image signal processing device comprising a plurality of sets of series connected elements, each of said sets comprising, in the recited order, a first transparent electrode element, an electricity-to-light conversion element having an electrical resistance R, a negative resistance element having a voltage-current curve which has a transition point from a portion of high resistance $R_h$ to a portion of low resistance $R_l$ at a critical voltage $V_c$, a light-to-electricity conversion element having electrical resistances $R_1$ and $R_2$ when irradiated with light having intensities $L_1$ and $L_2$, respectively, where $L_1$ is lower than and $L_2$ is higher than a critical intensity $L_c$ which causes said negative resistance element in each of said series connections to receive a voltage above or below said critical voltage $V_c$, respectively, when each of said series connections is provided with a given voltage V, and a second transparent electrode element, whereby when said light-to-electricity conversion elements are irradiated with a light image and said given voltage V is applied to said device, each electricity-to-light conversion element is energized by a voltage $RV/(R+R_1+R_h)$ or $RV/(R+R_2+R_l)$ when said light-to-electricity conversion element is irradiated with the light intensity $L_1$ or $L_2$, and, accordingly, said light image has the contrast increased.

2. An image signal processing device defined in claim 1, wherein said electricity-to-light conversion element consists essentially of an electroluminescent material.

3. An image signal processing device defined by claim 1, wherein said electricity-to-light conversion element consists essentially of a light emitting diode.

4. An image signal processing device defined by claim 1, wherein said negative resistance element consists essentially of one element selected from the group consisting of a switching diode and a thermistor having a negative temperature coefficient of resistance.

5. An image signal processing device defined by claim 1, wherein said light-to-electricity conversion element consists essentially of a photoconductive material.

6. An image signal processing device defined by claim 1 wherein said series connected elements are in a panel including a transparent base, a first transparent electrode layer on said transparent base, an electroluminescent layer integrally formed on said first transparent electrode layer, a negative resistance layer integrally formed on said electroluminescent layer, a photoconductive layer superposed on said negative resistance layer, and a second transparent electrode layer superposed on said photoconductive layer.

7. An image signal processing device defined by claim 6, wherein said negative resistance layer consists essentially of a thermistor layer comprising finely divided powder dispersed in a binding material and having a negative temperature coefficient of resistance.

8. An image signal processing device defined by claim 7, wherein said thermistor layer has a heating element embedded therein so as to control the size of said critical voltage $V_c$.

9. An image signal processing device comprising a first transparent electrode element, and electricity-to-light conversion element on said first transparent electrode element, a light-to-electricity conversion element integrally formed on said electricity-to-light conversion element, and a second transparent electrode element on said light-to-electricity conversion element, and a switching transistor connected to one of said first transparent electrode element and said second transparent electrode element.

10. An image signal processing device defined by claim 9, wherein said electricity-to-light conversion element and said light-to-electricity conversion element have a light preventing element sandwitched therebetween.

11. An image signal processing device defined by claim 9, wherein said switching transistor is biased between the emitter and the base so as to control the size of the critical voltage $V_c$ of said device.

* * * * *